(12) United States Patent
Park et al.

(10) Patent No.: US 8,370,379 B2
(45) Date of Patent: Feb. 5, 2013

(54) METHOD AND SYSTEM FOR PROVIDING QUERY USING AN IMAGE

(75) Inventors: Gunhan Park, Yongin-si (KR); Byounghak Kim, Seoul (KR); Dong Wook Kim, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 0 days.

(21) Appl. No.: 13/085,844

(22) Filed: Apr. 13, 2011

(65) Prior Publication Data

US 2011/0258222 A1  Oct. 20, 2011

(30) Foreign Application Priority Data

Apr. 14, 2010 (KR) .................. 10-2010-0034444

(51) Int. Cl.
*G06F 17/30* (2006.01)

(52) U.S. Cl. ............ 707/767; 707/769; 707/999.107; 707/999.003

(58) Field of Classification Search ........... 707/769, 707/999.003
See application file for complete search history.

(56) References Cited

U.S. PATENT DOCUMENTS 8,036,684 B2 * 10/2011 Hendriks et al. ........... 455/456.5
2004/0260464 A1 * 12/2004 Wong ........................ 701/209
2006/0089788 A1 * 4/2006 Laverty ..................... 701/202
2008/0268876 A1 * 10/2008 Gelfand et al. .............. 455/457
2009/0083237 A1 * 3/2009 Gelfand et al. ................. 707/4
2009/0171559 A1 * 7/2009 Lehtiniemi et al. ......... 701/201
2009/0177653 A1 * 7/2009 Hirabayashi ................... 707/5
2009/0319166 A1 * 12/2009 Khosravy et al. ........... 701/200
2010/0017290 A1 * 1/2010 Matsui ..................... 705/14.52
2010/0082242 A1 * 4/2010 Park ........................... 701/208
2011/0106782 A1 * 5/2011 Ke et al. ...................... 707/706
2011/0109435 A1 * 5/2011 Bickel et al. ................. 340/8.1
2011/0179021 A1 * 7/2011 Wen et al. ................... 707/723

FOREIGN PATENT DOCUMENTS

| KR | 10-2009-0003410 | 1/2009 |
| KR | 10-2009-0093573 | 9/2009 |

* cited by examiner

*Primary Examiner* — Miranda Le
(74) *Attorney, Agent, or Firm* — H.C. Park & Associates, PLC (57) ABSTRACT

A method and system for providing a query using an image is disclosed. A search keyword is determined using an image and position information of a terminal that are received from the terminal. Search queries associated with the determined search keyword are provided to the terminal. Lower search queries may be provided to the terminal if one of the provided search queries is selected.

25 Claims, 5 Drawing Sheets

METHOD AND SYSTEM FOR PROVIDING QUERY USING AN IMAGE

CROSS REFERENCE TO RELATED APPLICATION

This application claims priority from and the benefit of Korean Patent Application No. 10-2010-0034444, filed on Apr. 14, 2010, which is hereby incorporated by reference for all purposes as if fully set forth herein.

BACKGROUND OF THE INVENTION

1. Field of the Invention

Exemplary embodiments of the present invention relate to a system and method for providing a query, and in particular, to a method and system for providing a query that may provide search services using an image.

2. Discussion of the Background

Due to development of the Internet and an increase in distribution of the Internet, various services using the Internet are provided. An example of the various services is a search service that provides, to a user, retrieval results corresponding to an input query after retrieving information with respect to the query input from the user.

For example, when a query is input by a user using a terminal, a web site, news, or a file name corresponding to the input query may be provided to the user. Various devices such as, for example, a terminal, computer, notebook, mobile phone, Digital Multimedia Broadcasting (DMB) phone, web book, Personal Digital Assistant (PDA), and the like, may be used to input the query and display the query results.

In the case of the conventional search services, a search query may be input through the terminal in a text format.

However, a search service is difficult to provide if the user has difficulty entering text into a terminal. For example, when a text signal inputted to a keypad of the terminal is erased, or text is difficult to input due to a user handicap that affects the user's hands, a desired query can not be input by the user, and thereby an appropriate search service can not be provided.

SUMMARY OF THE INVENTION

Exemplary embodiments of the present invention provide a system and method for supporting a query that provides a search query using an image.

Additional features of the invention will be set forth in the description which follows, and in part will be apparent from the description, or may be learned by practice of the invention.

Exemplary embodiments of the present invention disclose a method for providing a query. The method includes receiving at least one image and receiving position information of a terminal. The method further includes determining a search keyword based on the received image and the received position information of the terminal, and providing at least one search query associated with the determined search keyword.

Exemplary embodiments of the present invention also disclose a system to provide a query. The system includes an image receiving unit, a search keyword determination unit, and a query providing unit. The image receiving unit receives at least one image and position information of a terminal. The search keyword determination unit determines at least one search keyword based on the received at least one image and the received position information of the terminal. The query providing unit provides at least one search query associated with the determined at least one search keyword.

Exemplary embodiments of the present invention also disclose a method for providing a query of a terminal. The method includes transmitting an image and position information, receiving at least one search query based on the transmitted image and the position information, and displaying the received at least one search query. The at least one search query is determined using a tag of the transmitted image that matches a tag of an image among images uploaded from terminals positioned within a reference distance of the terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present. In contrast, when an element is referred to as being "directly on" or "directly connected to" another element or layer, there are no intervening elements or layers present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
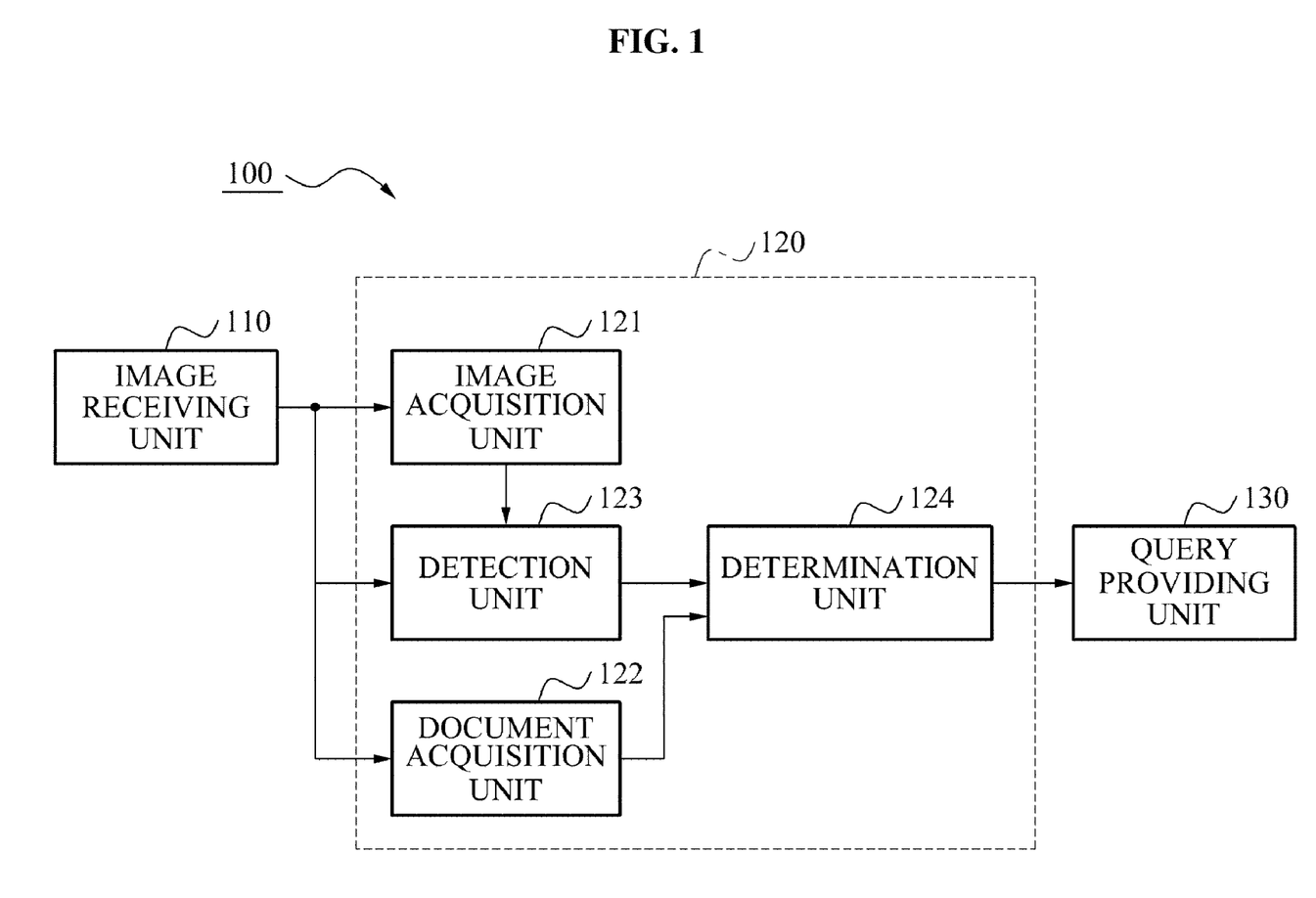
FIG. 1 is a block diagram of a system for providing a query according to exemplary embodiments of the present invention.

FIG. 1 is a block diagram of a system 100 for providing a query according to exemplary embodiments of the present invention.

Referring to FIG. 1, the system 100 for providing the query may include an image receiving unit 110, a search keyword determination unit 120, and a query providing unit 130.

The image receiving unit 110 may receive an image and position information of the terminal from the terminal.

In some cases, the image receiving unit 110 may receive an image stored in the terminal or an image acquired using a camera of the terminal. In general, an image may be obtained through any suitable means and provided to the image receiving unit 110 by the terminal. The image receiving unit 110 may also receive, from the terminal, position information including position coordinates of the terminal. For example, Global Positioning System (GPS) information may be used to provide the location and coordinates of the terminal. In general, any suitable means may be used to provide position information to the image receiving unit 110.

The search keyword determination unit 120 may determine at least one search keyword using the received image and position information of the terminal. The search keyword determination unit 120 includes an image acquisition unit 121, a document acquisition unit 122, a detection unit 123, and a determination unit 124.

The image acquisition unit 121 may acquire, from the terminal, images that are uploaded from other terminals positioned within a predetermined reference distance of the received position of the terminal.

For example, if the reference distance is predetermined to be 1 km, the image acquisition unit 121 may acquire images that are uploaded from terminals positioned within a 1 km radius of the terminal's position.

The document acquisition unit 122 may acquire documents that are uploaded from terminals positioned within the reference distance of the terminal's position.

For example, when the reference distance is predetermined to be 1 km, the document acquisition unit 121 may acquire documents that are uploaded from terminals positioned within a 1 km radius of the terminal's position. The documents may include, but are not limited to, texts or messages. For example, the messages may include Short Message Service (SMS), Long Message Service (LMS), and Multimedia Message Service (MMS). The messages may be uploaded using a text service function of a mobile terminal using various applications. Images may be uploaded using MMS. In general, various methods and techniques may be utilized to upload images and/or documents from terminals positioned within the reference distance of the terminal's position.

The detection unit 123 may match an image of the received images with an image among the acquired images by comparing the acquired images and the received images. Various algorithms and programs may be used to match a received image to an acquired image.

The determination unit 124 may determine a search keyword using a tag of the matched image and the acquired documents. A tag of the matched image may include keywords such as a capture date of the image, a photographer of the image, a subject of the image, or a photographed location of the image. The determination unit 124 may detect, from the acquired documents, common keywords such as 'Gang-Nam', 'bus', 'coffee', 'Bang-Bang intersection', 'Seoul National University of Education', 'map', or 'Gang-Nam Kyo-Bo book store'.

The determination unit 124 may determine a common keyword to be a search keyword, in part, by comparing the detected common keywords in the acquired documents with the keywords included in the tag of a matched image. For example, if a subject of an acquired document is information on popular restaurants, and the location of the matched image is Gang-Nam Nam station exit 5, the determination unit 124 may determine 'Gang-Nam' as the search keyword.

Next, the query providing unit 130 may provide, to the terminal, at least one search query associated with the determined search keyword.

For example, when the search keyword is determined as 'Gang-Nam', the query providing unit 130 may provide, to the terminal, search queries such as 'popular restaurants in Gang-Nam station', 'Gang-Nam station bus route', 'Gang-Nam station map', and/or 'Gang-Nam station exit 5'.

In some cases, if the search keyword is determined as 'Gang-Nam Kyo-Bo book store', the query providing unit 130 may provide, to the terminal, search queries such as, for example, 'find book cover' or 'book price information', which are associated with 'Gang-Nam Kyo-Bo book store'. In some cases, by having knowledge of the terminal's location using GPS information, the query providing unit 130 may reduce a search scope of the search query using, for example, an image to thereby more rapidly provide search services.

The query providing unit 130 may provide, to the terminal, real-time rush search queries corresponding to the determined search keyword. For example, when 'Gang-Nam' is determined as the search keyword, the query providing unit 130 may provide, to the terminal, within a predetermined period of time, popular search queries from among the real-time rush search queries in association with 'Gang-Nam' and search queries associated with 'Gang-Nam station'.

When a search query is selected from the terminal, the query providing unit 130 may also provide, to the terminal, lower search queries of the selected search queries.

For example, when the selected search query is 'popular restaurants in Gang-Nam station', the query providing unit 130 may provide, to the terminal, lower search queries such as, for example, 'Gang-Nam station Han-Jeong-Sik' or 'Gang-Nam station snack bar'.

In addition, when a received image is not matched with an acquired image, the determination unit 124 may detect common keywords from the acquired documents, and determine the search keyword using only the detected common keywords from the acquired documents.

For example, when the common keywords of acquired documents are detected as 'Gang-Nam', 'Bus', and 'Coffee', the determination unit 124 may count a number of acquired documents having 'Gang-Nam' as a keyword. Next, the determination unit 124 may respectively count a number of the acquired documents having 'Bus' as a keyword, and a number of acquired documents having 'Coffee' as a keyword.

The determination unit 124 may determine, as the search keyword, the common keyword having the highest counted number of the documents.

For example, when the number of documents having 'Gang-Nam', 'Bus', and 'Coffee' as a keyword is 10, 5, and 3, respectively, the determination unit 124 may determine 'Gang-Nam' as the search keyword. Next, the query providing unit 130 may provide, to the terminal, at least one search query associated with the determined 'Gang-Nam'.

Figure 3:
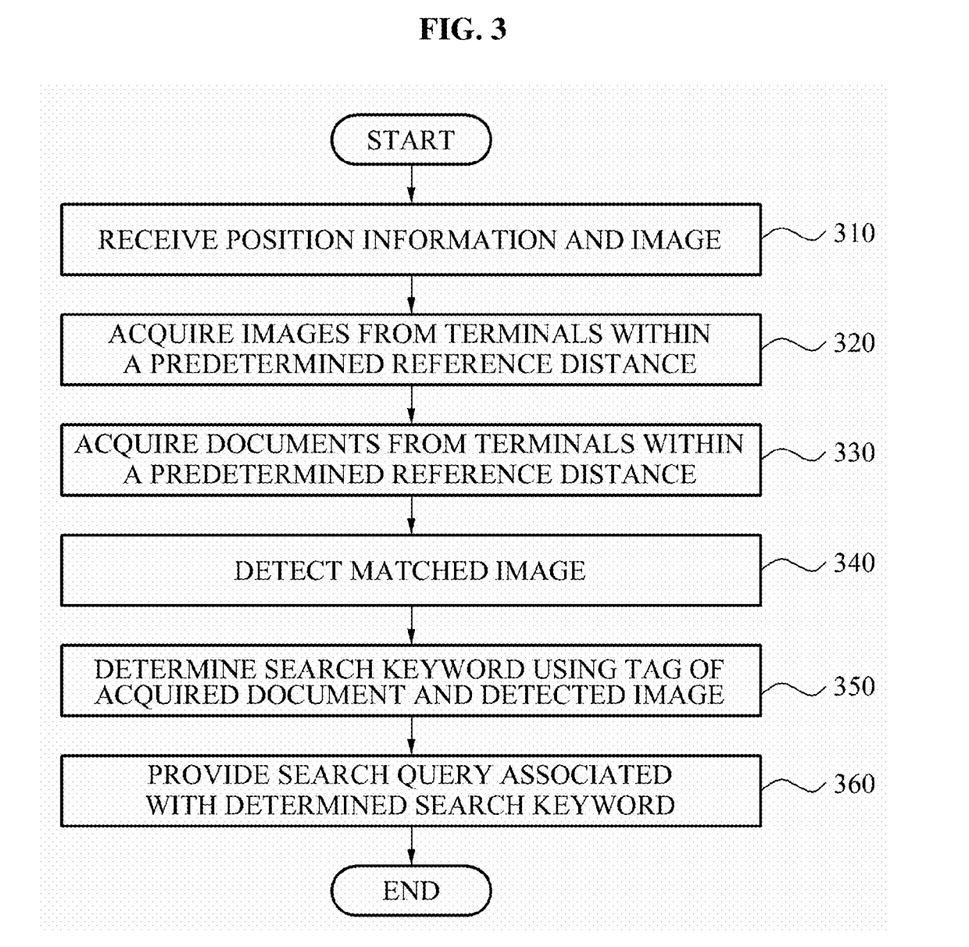
FIG. 3 is a flowchart illustrating a method for providing a query according to exemplary embodiments of the present invention.

FIG. 3 is a flowchart illustrating a method for providing a query according to exemplary embodiments of the present invention.

Referring to FIG. 3, the image receiving unit 110 may receive position information of a terminal and an image (310).

For example, the image receiving unit 110 may receive an image obtained by a camera of the terminal or an image stored in the terminal, and GPS information may be used to provide the position information of the terminal. GPS information may include current position coordinates of the terminal. For example, the GPS may provide the latitude and longitude at which the terminal is located.

Subsequently, the image acquisition unit 121 may acquire images that are uploaded from terminals positioned within a predetermined reference distance of the terminal's location (320).

Next, the document acquisition unit 122 may acquire documents that are uploaded from the terminals positioned within the predetermined reference distance of the terminal's location (330). The documents may include, but are not limited to, text and other messages.

The detection unit 123 may then match a received image with an acquired image (340).

For example, the detection unit 123 may detect a received image in which a pixel or a pixel disposition of the received image matches a corresponding element (e.g., pixel or pixel disposition) in the acquired image by, for example, 90% or more. It should be appreciated that a matching threshold of matching images may be predefined and/or may vary. For example, the pixel or pixel dispositions may match, in some cases, up to 80% or more and in some cases up to 95% or more.

Next, the determination unit 124 may determine a common keyword from a tag of the matched image and/or from the acquired documents, and may determine the detected common keyword as a search keyword (350). The tag of the image may include keywords such as, but not limited to, a capture date of the image, a photographer of the image, a subject, and a photographed location of the image.

For example, the determination unit 124 may determine common keywords from the acquired documents, and may determine, as the search keyword, keywords included in the tag of a matched image and in the acquired documents.

Subsequently, the query providing unit 130 may provide, to the terminal, search queries associated with the determined search keyword (360).

The terminal may receive the search queries, and may display the received search queries on a display. A user of the terminal may subsequently select at least one of the displayed search queries. The terminal may then transmit, to the system 100, the selected search query. The terminal may include an input unit through which the user may select a search query. The input unit may be a touch interface, a keyboard, a mouse, a microphone, and may, in general, be any suitable means of obtaining a selection of a search query from the user.

When a terminal obtains its position information, the query providing unit 130 may determine a search scope of the search query associated with the determined search keyword and the position information of the terminal. At least one search query associated with the search keyword determined within the determined search scope may then be provided. In general, various other means may also be utilized to modify the search scope of a search query.

For example, when the search keyword is determined as 'Gang-Nam Kyo-Bo book store', the query providing unit 130 may limit the search scope to 'book', and provide, to the terminal, search queries such as, for example, 'find book cover' or 'book price information' associated with 'Gang-Nam Kyo-Bo book store' within the limited search scope.

The query providing unit 130 may also provide, to the terminal, real-time rush search queries corresponding to the determined search keyword.

The query providing unit 130 may also provide, to the terminal, lower search queries of the selected search query. For example, when the selected search query is 'popular restaurants in Gang-Nam station', the query providing unit 130 may provide, to the terminal, the lower search queries such as, for example, 'Gang-Nam station spaghetti', 'Gang-Nam station Han-Jeong-Sik', or 'Gang-Nam station snack bar'.

Figure 4:
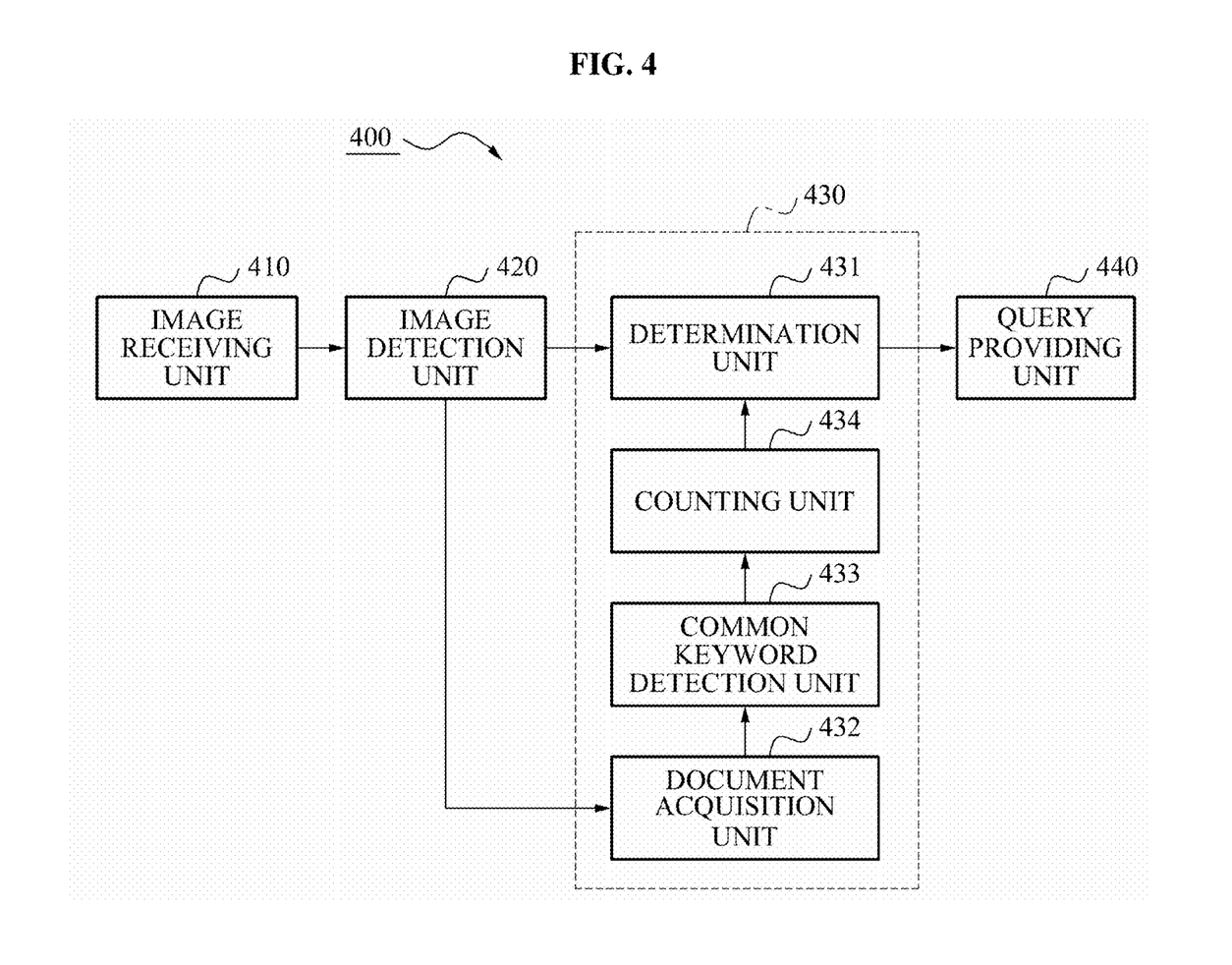
FIG. 4 is a block diagram of a system for providing a query according to exemplary embodiments of the present invention.

FIG. 4 is a block diagram of a system 400 for providing a query according to exemplary embodiments of the present invention.

Referring to FIG. 4, the system 400 for providing the query includes an image receiving unit 410, an image detection unit 420, a search keyword determination unit 430, and a query providing unit 440.

The image receiving unit 410 may receive an image from a terminal. For example, the image receiving unit 410 may receive an image obtained by a camera of the terminal or an image stored in the terminal.

The image detection unit 420 may compare the images received by the image receiving unit 410 and images that have already been stored in the system 400. Next, the image detection unit 420 may detect a stored image that matches a received image by more than a predetermined reference threshold.

For example, when the reference threshold is 90%, the image detection unit 420 may detect a stored image that matches a received image by at least 90%. In some cases, the image detection unit 420 may detect the matched image by comparing a degree by which images uploaded from other plurality of terminal devices match stored images of the terminal regardless of a location of the terminal. It should be appreciated that the reference threshold may vary and may be set to any suitable value. For example, in some cases, the reference threshold may be 80% or more and in some cases, 95% or more.

In some cases, the search keyword determination unit 430 may determine the search keyword using the detected image. The search keyword determination unit 430 includes a determination unit 430, a document acquisition unit 432, a common keyword detection unit 433, and a counting unit 434.

When a stored image matched with the received image is detected, the determination unit 431 may determine the search keyword using a tag of the detected image. For example, the tag of the image may include keywords such as, but not limited to, a capture date of the image, a photographer of the image, a subject of the image, a photographed location of the image.

When a matching image is not detected, the document acquisition unit 432 may receive position information of the terminal from the terminal. Next, the document acquisition unit 432 may acquire documents uploaded from other terminals positioned within a predetermined reference distance of the terminal.

Next, the common keyword detection unit 433 may detect common keywords of the acquired documents.

For example, the common keyword detection unit 433 may detect common keywords having more than a predetermined reference number of times corresponding to detections in the acquired documents by comparing the acquired documents. For example, when 100 documents are acquired, and the reference number of times is 5, the common keyword detection unit 433 may detect keywords that are commonly detected more than five times in each of the one hundred documents.

The counting unit 434 may count a number of documents including the common keywords with respect to the detected common keywords.

For example, when 'Gang-Nam', 'Bus', and 'Coffee' are detected as the common keywords, the counting unit 434 may count the number of documents including 'Gang-Nam', 'Bus', and 'Coffee' as having, for example, 10, 5, and 3, occurrences each, respectively, in the one hundred acquired documents.

Next, the counting unit 431 may determine a common keyword having the highest count in the acquired documents as the search keyword. For example, 'Gang-Nam' may be determined as the search keyword since 'Gang-Nam' has the highest count (e.g., 10) in the acquired documents.

When a matched image is not detected, the determination unit 431 may determine the search keyword using only the acquired documents.

The query providing unit 440 may provide, to the terminal, search queries associated with the determined search keyword. Next, the terminal may display the search queries on a display. A user may subsequently select at least one of the displayed search queries. The terminal may then transmit, to the system 400, the selected search query. The terminal may include an input unit through which the user may select a search query. The input unit may be a touch interface, a keyboard, a mouse, a microphone, and may, in general, be any suitable means of obtaining a selection of a search query from the user.

Next, the query providing unit 440 may provide, to the terminal, lower search queries of the selected search query.

Figure 5:
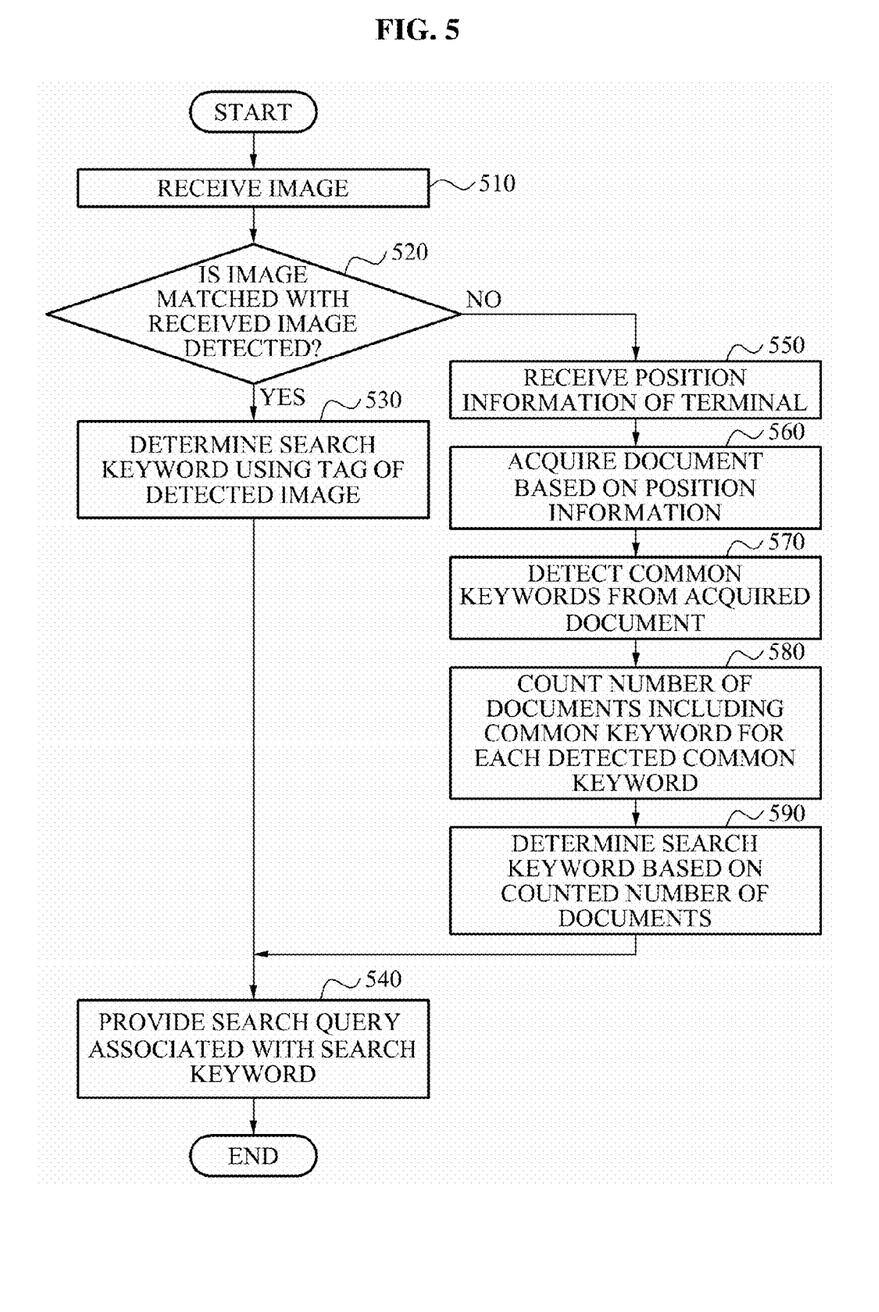
FIG. 5 is a flowchart illustrating a method for providing a query according to exemplary embodiments of the present invention.

FIG. 5 is a flowchart illustrating a method for providing a query according to exemplary embodiments of the present invention.

Figure 2:
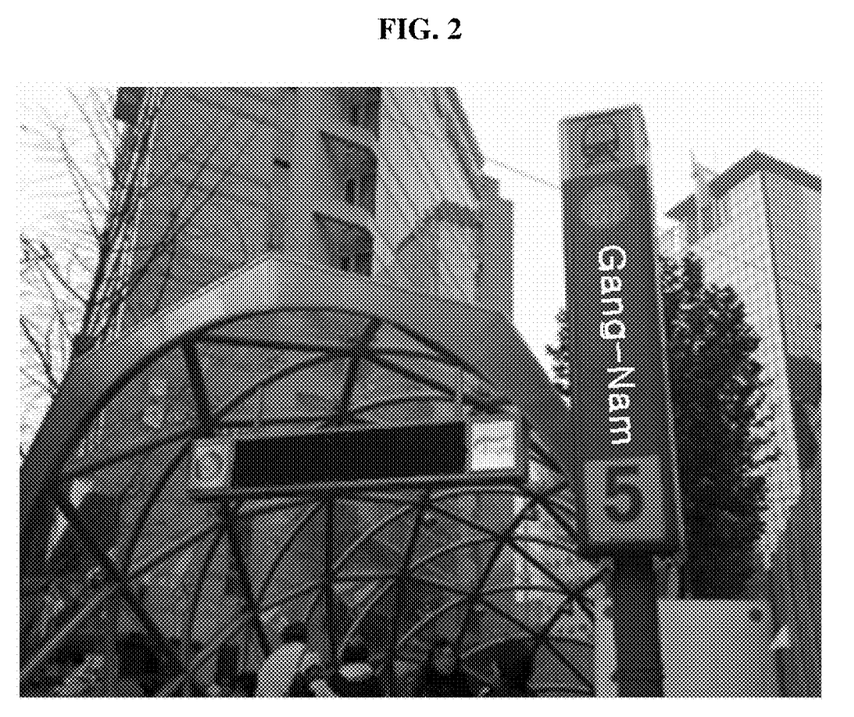
FIG. 2 is an image used in a method for providing a search query according to exemplary embodiments of the present invention.

Referring to FIG. 5, the image receiving unit 410 may receive, from a terminal, an image used for providing a search query (510). The image receiving unit 410 may receive, as illustrated in FIG. 2, an image obtained by a camera of the terminal or an image stored in the terminal.

The image detection unit 420 may detect a stored image that matches a received image. For example, the image detection unit 420 may detect a stored image that matches a received image by more than a predetermined reference threshold.

If a stored image matched with the received image is detected (520), the determination unit 431 may determine a search keyword using a tag of the detected image (530).

If a matching image is not detected (520), the document acquisition unit 432 may receive position information of the terminal (550).

After receiving position information of the terminal, the document acquisition unit 432 acquires documents uploaded from other terminals positioned within a predetermined reference distance from the terminal (560).

Next, the common keyword detection unit 433 may detect common keywords in the acquired documents (570).

In some cases, the common keyword detection unit 433 may detect keywords common in all of the acquired documents, and, in some cases, may detect keywords common in at least a predetermined reference number of the acquired documents.

For example, when a number of the acquired documents is 100, and the keywords common in all of the acquired documents are detected, the common keyword detection unit 433 may detect common keywords in all one hundred documents.

In some cases, if the number of the acquired documents is 100 and the reference number is 50, and keywords common to acquired documents of more than the reference number are detected, the common keyword detection unit 433 may detect, as the common keywords, keywords being detected in the acquired documents more than 50 times.

Next, the counting unit 434 may count a number of documents including the common keyword for each of the detected common keywords (580).

For example, when 'Gang-Nam', 'Bus', and 'Coffee' are detected as the common keywords in operation 570, the counting unit 434 may count the number of documents of the one hundred acquired documents that include a keyword, (e.g., 'Gang-Nam'). Also, the counting unit 434 may respectively count the number of documents including 'Bus' and 'Coffee'.

Next, the determination unit 431 may determine, as the search keyword, a keyword in which the counted number of documents is the highest (590).

For example, when the number of documents including 'Gang-Nam', 'Bus', and 'Coffee' is counted as 10, 5, and 3, respectively, the determination unit 431 may determine 'Gang-Nam' as the search keyword.

The query providing unit 440 may provide, to the terminal, a search query associated with the determined search keyword (540).

For example, the query providing unit 440 may provide, as the search queries, 'popular restaurants in Gang-Nam station', 'Gang-Nam station bus route', or 'Gang-Nam station map'. Next, the search queries such as 'popular restaurants in Gang-Nam station', 'Gang-Nam station bus route', 'Gang-Nam station map', and the like may be displayed on a display of the terminal. Next, the terminal may transmit, to the system 400 for providing the query, a search query selected by a user. The query providing unit 440 may then provide, to the terminal, a lower search query corresponding to the selected search query.

For example, when 'popular restaurants in Gang-Nam station' is selected, the query providing unit 440 may provide, to the terminal, 'Gang-Nam spaghetti', 'Gang-Nam station Han-Jeong-Sik', 'Gang-Nam station coffee', or 'Gang-Nam station bakery' as the lower search queries. Next, the lower search queries may be displayed on the terminal.

In addition, when 'Gang-Nam' is determined as the search keyword in (590), the query providing unit 440 may provide, to the terminal, real-time rush search queries that are uploaded in association with 'Gang-Nam'.

For example, the query providing unit 440 may provide, to the terminal, the real-time time rush search queries associated with 'Gang-Nam station', or popular search queries within a predetermined period of time among 'Gang-Nam station'-related search queries.

As described above, the system and method for providing the query according to exemplary embodiments described with reference to FIGS. 4 and 5 may determine the search scope of the search query associated with the determined search keyword using the received image. For example, when the position information of the terminal is known, the query providing unit 440 may determine the search scope of the search query associated with the determined search keyword using the received image and terminal position. At least one search query associated with the determined search keyword within the determined search scope may be provided.

As described above, the position information of the terminal may be received from the terminal; however, this is merely an example. Thus, the system 100/400 for providing the query may generate the position information including position coordinates of the terminal using any suitable technique including, for example, a triangulation technique.

Exemplary embodiments of the present invention may be recorded in a non-transitory computer-readable medium including program instructions to implement the exemplary embodiments of the present invention. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method, using a processor, for providing a query, the method comprising:
    receiving at least one image;
    receiving position information of a terminal;
    receiving at least one document uploaded from at least one terminal positioned within a reference distance of the terminal;
    determining, by the processor, a search keyword based on the received image and the received position information of the terminal; and
    providing at least one search query associated with the determined search keyword,
    wherein receiving the at least one image comprises receiving one or more images from the terminal and acquiring one or more images uploaded from the at least one terminal positioned within the reference distance of the terminal, and
    wherein determining the search keyword comprises:
        detecting a received image from the terminal that matches an acquired image by comparing the one or more acquired images and the one or more received images; and
        determining the search keyword using the received at least one document and the detected image.

2. The method of claim 1, wherein determining the search keyword further comprises:
    detecting common keywords from the received at least one document; and
    determining the search keyword using the detected common keywords and a tag of the detected image.

3. The method of claim 2, wherein determining the search keyword further comprises determining, as the search keyword, at least one of a common keyword among the detected common keywords and a keyword in the tag of the detected image.

4. The method of claim 1, wherein determining the search keyword further comprises determining, as the search keyword, at least one keyword in the received at least one document if no match between a received image from the terminal and an acquired image is detected.

5. The method of claim 1, further comprising:
    receiving a search query selected from the provided at least one search query; and
    providing lower search queries corresponding to the selected search query.

6. The method of claim 1, wherein the at least one search query associated with the determined search keyword comprises a real-time rush keyword corresponding to the determined search keyword.

7. The method of claim 1, wherein providing at least one search query comprises:
    determining a search scope of the at least one search query associated with the determined search keyword using the received at least one image if the position information of the terminal is received; and
    providing the at least one search query according to the determined search scope.

8. The method of claim 1,
    wherein determining the search keyword comprises:
        detecting an image of the acquired images that matches one of the one or more received images comprising a plurality of images stored in the terminal by comparing the acquired images with the plurality of stored images; and
        determining the search keyword based on the detected image.

9. The method of claim 8, wherein determining the search keyword further comprises determining the search keyword using a tag of the detected image.

10. The method of claim 8, wherein determining the at least one search keyword further comprises determining a search keyword based on the received position information of the terminal if an image of the at least one received image that most closely matches one of the plurality of stored images is not detected.

11. The method of claim 10, wherein determining the at least one search keyword further comprises:
    acquiring documents uploaded from terminals positioned within a reference distance from the terminal;
    detecting common keywords in the acquired documents;
    counting a number of the acquired documents comprising the common keywords for each of the common keywords; and
    determining, as the search keyword, a common keyword having the highest counted number.

12. A system to provide a query, the system comprising:
    a storage device;
    an image receiving unit to receive at least one image and position information of a terminal;
    a search keyword determination unit stored on the storage device and configured to determine at least one search keyword based on the received at least one image and the received position information of the terminal; and
    a query providing unit to provide at least one search query associated with the determined at least one search keyword, wherein the search keyword determination unit comprises:
- an image acquisition unit to acquire images uploaded from terminals positioned within a reference distance of the terminal;
- a document acquisition unit to acquire documents uploaded from the terminals positioned within the reference distance of the terminal;
- a detection unit to detect an image of the received at least one image that matches the acquired images by comparing the acquired images and the received at least one image; and
- a determination unit to determine the at least one search keyword using the acquired documents and the detected image.

13. The system of claim 12, wherein the determination unit detects common keywords in the acquired documents, and determines the at least one search keyword using the detected common keywords and a tag of the detected image.

14. The system of claim 13, wherein the determination unit determines, as the at least one search keyword, at least one of a common keyword among the detected common keywords and the tag of the detected image.

15. The system of claim 12, wherein the determination unit determines, as the at least one search keyword, at least one common keyword in the acquired documents if an image of the received at least one image that matches the acquired images is not detected.

16. The system of claim 12, wherein the query providing unit receives a search query selected from the provided at least one search query, and provides lower search queries corresponding to the received selected search query.

17. The system of claim 12, wherein the query providing unit provides at least one real-time rush search query corresponding to the determined at least one search keyword.

18. The system of claim 12, wherein the query providing unit determines a search scope of the at least one search query associated with the at least one determined search keyword using the detected image if the position information of the terminal is received, and provides the at least one search query within the determined search scope.

19. The system of claim 12, wherein the
- detection unit is configured to detect an image of the acquired images that matches the received at least one image comprising a plurality of images stored in the terminal by comparing the acquired images with the plurality of stored images,
- wherein the search keyword determination unit determines the at least one search keyword based on the detected image.

20. The system of claim 19, wherein the search keyword determination unit determines the at least one search keyword using a tag of the detected image.

21. The system of claim 20, wherein the search keyword determination unit further comprises:
- a common keyword detection unit to detect common keywords in the acquired documents; and
- a counting unit to count a number of the acquired documents including the common keywords for each of the common keywords, and
- wherein the determination unit is configured to determine, as the at least one search keyword, a common keyword having a highest count number.

22. The system of claim 19, wherein if an image of the received at least one image that matches the plurality of stored images is not detected, the search keyword determination unit determines the at least one search keyword based on the received position information of the terminal.

23. A method for providing a query of a terminal, the method comprising:
- transmitting, by the terminal, an image and position information;
- receiving at least one search query based on the transmitted image, the position information, and at least one document uploaded from at least one terminal positioned within a reference distance of the terminal; and
- displaying the received at least one search query,
- wherein the at least one search query is determined using a tag of a transmitted image that matches a tag of an image among images uploaded from the at least one terminal positioned within the reference distance of the terminal,
- wherein the at least one search query is associated with a search keyword, the search keyword being determined by:
  - detecting an image transmitted by the terminal that matches an uploaded image by comparing one or more uploaded images and one or more images transmitted by the terminal; and
  - determining the search keyword using the at least one document and the detected image.

24. The method of claim 23, wherein the at least one search query is determined, in part, using at least one common keyword among documents uploaded from the terminals positioned within the reference distance of the terminal.

25. The method of claim 23, further comprising:
- transmitting a search query selected from the displayed at least one search query; and
- receiving and displaying a lower search query corresponding to the selected search query.

* * * * *